July 28, 1931. H. BARNOWITZ 1,816,760
EDUCATIONAL GAME APPARATUS
Filed Oct. 30, 1929 2 Sheets-Sheet 1
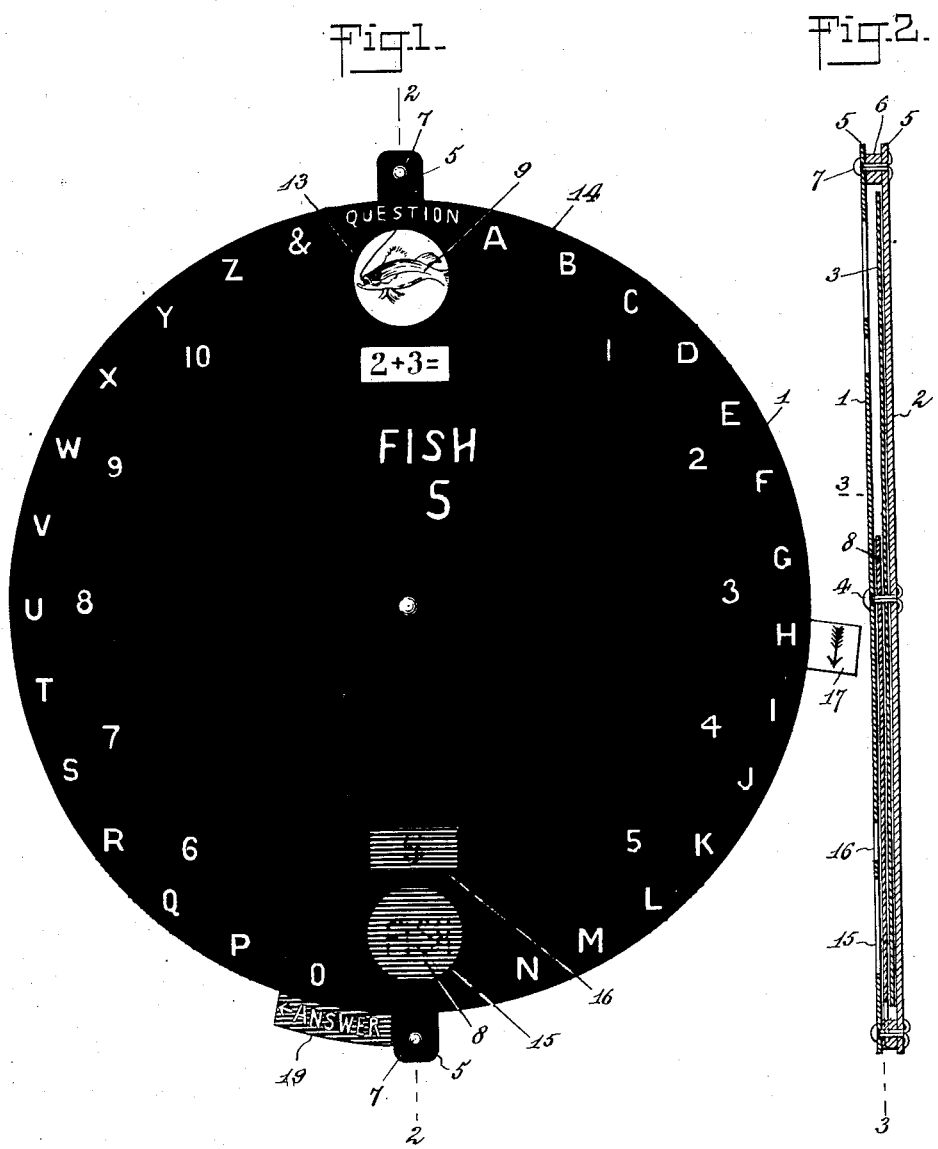
WITNESSES
William P. Goebel
S. W. Porter
INVENTOR
Harry Barnowitz
BY
ATTORNEYS July 28, 1931.  H. BARNOWITZ  1,816,760
EDUCATIONAL GAME APPARATUS
Filed Oct. 30, 1929   2 Sheets-Sheet 2
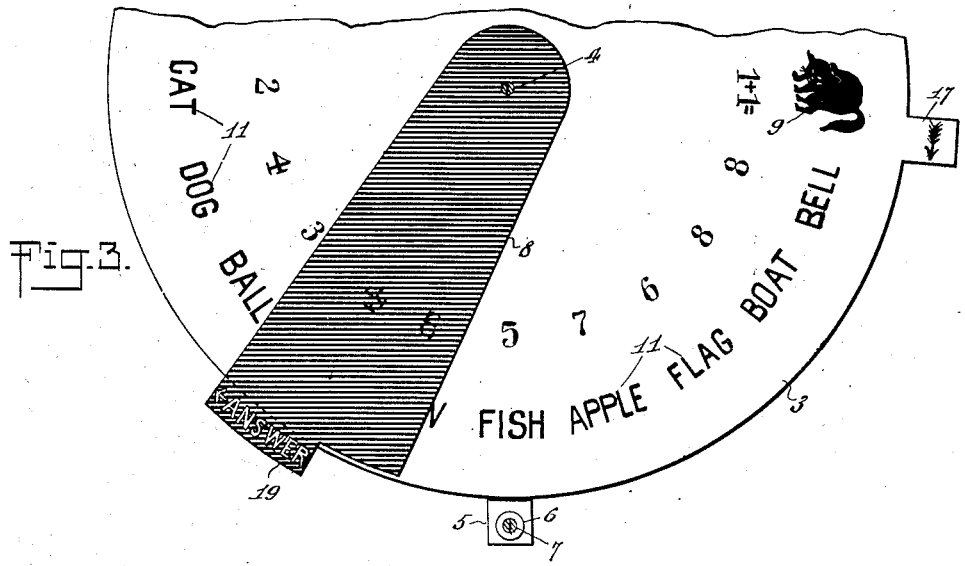
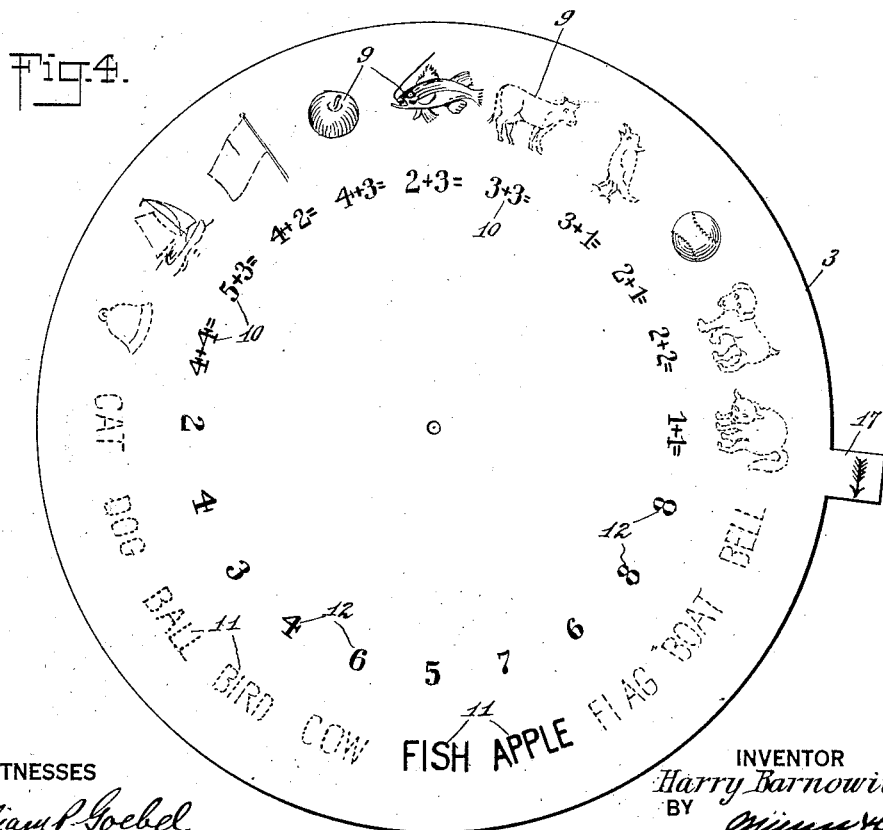
WITNESSES
INVENTOR
Harry Barnowitz
BY
ATTORNEYS Patented July 28, 1931

1,816,760

UNITED STATES PATENT OFFICE

HARRY BARNOWITZ, OF BROOKLYN, NEW YORK

EDUCATIONAL GAME APPARATUS

Application filed October 30, 1929. Serial No. 403,577.

This invention relates to educational game apparatus which constitutes in effect a toy which is entertaining and instructive to a child or other user.

A further object is to provide a device of this character in which a problem and a pictorial representation are disclosed, and the proper answer is normally covered so that when the child writes the answer to the problem he can uncover the proper answer and discover whether or not his written answer is correct.

A further object is to provide a device of this character in which the outer surface is preferably coated or covered to form what is ordinarily known in the trade as a slate so that a slate pencil or chalk can be used and easily erased after writing on the surface.

A further object is to provide a device of this character which contains on its outer face letters and numerals which will act as a guide to the child in forming the letters and numerals.

A further object is to provide a device of this character which can be manufactured and sold at a low price and which will constitute a source of amusement as well as result in the improvement of the mind of the child.

With these and other objects in view, the invention consists in certain novel features of construction and combinations and arrangements of parts which will be more fully hereinafter described and pointed out in the claim.

In the accompanying drawings—

Figure 1 is a plan view of my improved device;

Figure 2 is a view in longitudinal section on the line 2—2 of Figure 1;

Figure 3 is a fragmentary view of a portion of the intermediate disk of the device showing the shutter thereon;

Figure 4 is a complete plan view of the intermediate disk of my improved device.

While of course a device of this character is portable and may be in different positions, we will assume for purposes of description that it is in a horizontal position so that the disks forming the apparatus may be distinguished by terming them "upper", "lower" and "intermediate" disks.

My improved device comprises upper and lower disks 1 and 2 with an intermediate disk 3 but they are mainly hidden from view. All of these disks 1, 2 and 3 have a pivot at their centers which connects them and which constitutes an ordinary clip 4, or may be of any desired form which permits the intermediate disk to turn or move between the upper and lower disks.

The upper and lower disks are held against independent movement, and while I may employ various means for the purpose I have indicated tongues 5 at opposite edges of both of said disks 1 and 2 with spacers 6 between the tongues, and securing devices 7 securing the tongues and spacing devices together.

8 represents a shutter which is pivotally supported on the device 4 and located between the upper disk 1 and the intermediate disk 3, and this shutter 8 has a finger hold 19 thereon projecting from the periphery of the disks and preferably contains the word "Answer" and can be manually manipulated as will be hereinafter explained, and it will be noted particularly by reference to Figure 1 of the drawings that the finger hold 19 is limited in its movement in one direction by the spacer 6 between the tabs 7, and this is the normal closed position of the shutter.

The intermediate disk 3 is provided on its upper face with a circular series of pictures 9 with a mathematical problem 10 adjacent the same and words 11 and numerals 12 diametrically opposite the pictures 9 and problem 10.

The upper disk 1 is provided with openings 13 and 14 to expose the pictures and problems and is provided at diametrically opposite points with openings 15 and 16 disclosing the words and numerals describing the picture and answering the problems. These latter openings 15 and 16 are normally covered by the shutter 8, as clearly indicated in Figure 1 of the drawings.

On the face of the upper disk 1 the letters of the alphabet and numerals from 1 to 10 are preferably provided as a guide to the child in writing the proper letters and numerals on the disk, and as this disk has a surface which constitutes in effect a blackboard a pencil of chalk may be used and the writing easily erased.

A tongue 17 projects from the disk 3 beyond the disks 1 and 2 so that by means of this finger the disk 3 may be turned.

In operation the disk 3 is manually turned to expose a picture and a problem through the openings 13 and 14. The child writes the word describing the picture and numeral or numerals indicating the answer to the problem on the surface of the disk 1. He then moves the shutter 8 to expose the answers so as to find out whether or not the written matter is correct. He then moves the shutter to close the openings 15 and 16 and turns the disk 2 to present another picture in the problem, and this operation is repeated indefinitely.

In describing the improved device I employ the word "disk" because the preferable formation of these parts is circular and relatively thin but it is obvious that this device may be otherwise shaped, and it is to be understood that I do not wish to limit myself in the claims by the employment of the term "disk" as limiting me to a circular form.

Various changes and alterations might be made in the general form of the parts described without departing from my invention and hence I do not limit myself to the precise details set forth but consider myself at liberty to make such changes and alterations as fairly fall within the spirit and scope of the appended claim.

I claim:

An educational game apparatus including a pair of outer disks, diametrically opposed tabs at the edges of said disks secured together and holding the disks in fixed relation, a movable disk located between the two outer disks and having a central rotary mounting, said movable disk having indicia thereon arranged in a circle, one-half of the circle having consecutively arranged problems and the rest correspondingly arranged answers thereto, one of said outer disks having openings therein exposing problems and answers, each answer being diametrically opposite the corresponding problems, a tab on the movable disk constituting a finger hold to move the disk, and being limited in its movement by the tabs of the outer disks, a shutter member located between the movable disk and one of the outer disks and normally covering the answer to the problem, and a finger hold on the shutter projecting beyond the disk and limited in its movement in one direction by contact with a pair of the first mentioned tabs.

HARRY BARNOWITZ.